O. N. BEAM.
COMPOUND ANTIRECOIL SPRING.
APPLICATION FILED JULY 1, 1918.
1,295,954.                                    Patented Mar. 4, 1919.
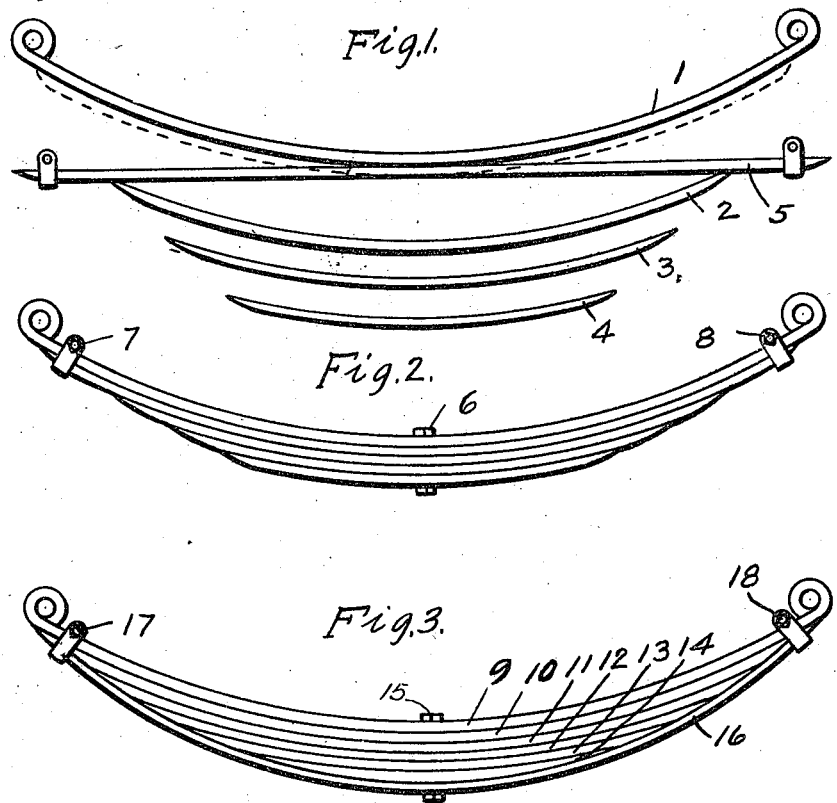
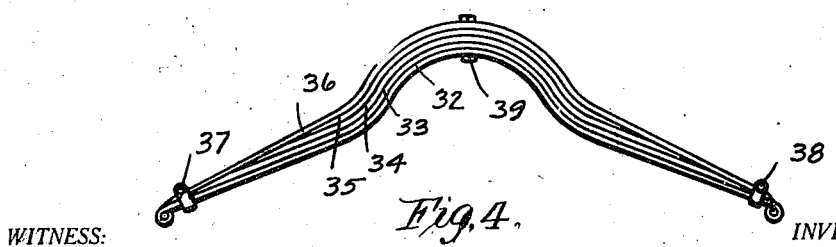
WITNESS:                                      INVENTOR.
                                              Oliver N. Beam,
                                          BY  Hazard & Miller
                                              ATTORNEY.

UNITED STATES PATENT OFFICE.

OLIVER N. BEAM, OF LOS ANGELES, CALIFORNIA.

COMPOUND ANTIRECOIL-SPRING.

1,295,954.　　　　　Specification of Letters Patent.　　Patented Mar. 4, 1919.

Application filed July 1, 1918. Serial No. 242,805.

*To all whom it may concern:*

Be it known that I, OLIVER N. BEAM, a citizen of the United States, residing at Los Angeles, in the county of Los Angeles and State of California, have invented new and useful Improvements in Compound Antirecoil-Springs, of which the following is a specification.

My object is to make a compound anti-recoil spring and my invention consists in the novel features herein shown, described and claimed.

Figure 1 is an elevation showing the leaves of one form of spring embodying the principles of my invention before the springs are drawn together.

Fig. 2 is an elevation of the spring with the leaves drawn together ready for use.

Fig. 3 is a view analogous to Fig. 2 and showing a modified construction.

Fig. 4 shows a second modification.

The normal spring leaves 1, 2, 3 and 4 in Figs. 1 and 2 are of the usual construction and the tensions of these leaves are all in one direction. My invention consists in placing a resisting spring leaf 5 in combination with the normal spring leaves. The resisting spring leaf 5 may be made straight or it may be oppositely curved to any desired extent and then when the leaves are to be assembled the resisting spring leaf 5 is preferably placed against the lower or outer face of the leaf 1, and the leaves 2, 3 and 4 are arranged successively, as is usual. Then the leaves are pressed together against the tension of the resisting spring leaf 5 and the bolt 6 or other suitable fastening applied to hold the leaves together at their centers, and clips 7 and 8 are applied to hold the ends of the resisting spring leaf 5 to the ends of the normal spring leaf 1. The tension of the resisting spring leaf 5 being exerted in an opposite direction from the tensions of the normal spring leaves 1, 2, 3 and 4 serves to hold the completed spring under tension to prevent its full expansion and to resist the rebound. When a spring is made up as in Fig. 2 with the ends of the normal spring leaves, 2, 3 and 4 unattached to the main spring leaf 1 the main spring leaf 1 must be strong enough to resist the rebound unassisted by the other leaves, and it frequently happens that the main leaf 1 is broken by rebound. The clips 7 and 8 holding the resisting spring leaf 5 to the main spring leaf 1 materially strengthen the main spring leaf and reduce the liability of the main spring leaf being broken upon the rebound to a minimum.

In the modification shown in Fig. 3 the spring is made up of the normal leaves 9, 10, 11, 12, 13 and 14 in the usual way. A longer bolt 15 is supplied and the resisting spring leaf 16 is secured in place by the bolt 15 against the outer face of the leaf 14 and against the outer faces of the ends of the leaves 13, 12, 11 and 10, and clips 17 and 18 secure the ends of the resisting spring leaf 16 to the ends of the main spring leaf 9. In this construction the strain of the rebound is transmitted from the ends of the main spring 9 through the clips 17 and 18 to the resisting spring leaf 16 and from the resisting spring leaf 16 to the ends of the normal leaves 10, 11, 12, 13 and 14, thereby making it practically impossible to break the main spring leaf 9 by a rebound.

In the second modification shown in Fig. 4 the spring consists of the main spring leaf 32, the normal spring leaves 33, 34 and 35, the resisting spring leaf 36, and the clips 37 and 38 connecting the ends of the resisting spring leaf 36 to the ends of the main spring leaf 32. The effect of this construction is substantially the same as the construction shown in Fig. 3, that is, the resisting spring leaf 36 is connected to the ends of the main spring leaf 32 to hold the normal leaves under tension and to reinforce the main spring leaf 32 to prevent breaking the main spring leaf by the rebound. The resisting spring leaf 36 also ties the ends of the normal spring leaves 33, 34 and 35 to the main spring leaf 32. The leaves are all connected by a central bolt 39.

It is obvious that instead of the bolt 6 in Fig. 2, or the bolt 15 in Fig. 3, or the bolt 39 in Fig. 4, any of the usual forms of U-bolt clips may be used.

It is obvious that when the springs are in action, the resisting spring leaf 5 in Fig. 2, or 16 in Fig. 3, or 36 in Fig. 4 must reciprocate or slide relative to the main spring leaves and that the clips 7 and 8, 17 and 18, and 37 and 38 must provide for this action.

Thus I have produced a compound anti-recoil spring comprising the combination with normal spring leaves, of a resisting spring leaf, the resisting spring leaf serving to hold the normal spring leaves under tension and serving to strengthen the normal spring leaves and prevent breaking upon the rebound and serving as a shock absorber to temper the rebound.

The resisting spring leaf may be combined with any of the usual normal spring leaf constructions, and in Figs. 3 and 4 the resisting spring leaf is simply an addition to the old springs.

I propose to make the resisting spring leaves and clips as accessories or attachments to be applied to springs already in use or to new springs of the ordinary construction.

By resisting spring leaf I mean a reverse spring leaf, a supplemental spring leaf, or a counter spring leaf, or a controlling spring leaf having a tension in opposition to the tension of the main spring so as to resist to the extent of its strength or tension the normal action of the main spring.

In the action of leaf springs when weight is applied the shock or force is conveyed from the center or support to the ends or end in the form of a wave. When a heavy engine is moving along a railroad track, you can see the wave caused by the weight of the engine traveling ahead of the engine and either the force of the weight or the force of the rebound travels along a spring in the same way. In order to control this wave to the fullest extent in a spring I have applied the resisting spring to come into contact with the main spring throughout its full active length so as to absorb the wave equally the full length of the main spring.

Various changes may be made without departing from the spirit of my invention as claimed.

I claim:

The combination with a normal convexed leaf spring of a resisting spring leaf against the convex side of and in contact with the normal leaf spring throughout its active length, the tension of the resisting leaf spring being in opposition to the tension of the normal leaf spring, means connecting the center of the resisting spring leaf to the center of the normal leaf spring, and clips connecting the ends of the resisting spring leaf to the ends of the normal leaf spring.

In testimony whereof I have signed my name to this specification.

OLIVER N. BEAM.